United States Patent

[11] 3,588,006

| [72] | Inventor | Douglas F. Koeppe |
| | | Galveston, Tex. |
| [21] | Appl. No. | 851,710 |
| [22] | Filed | Aug. 20, 1969 |
| [45] | Patented | June 28, 1971 |
| [73] | Assignee | Twenty-First Century Corporation |
| | | Galveston, Tex. |
| | | Continuation-in-part of application Ser. No. 702,086, Jan. 31, 1968, now abandoned. |

[54] DEVICE FOR PRODUCING USEFUL FORCES IN FLUIDS
6 Claims, 10 Drawing Figs.

[52] U.S. Cl. .................................................... 244/62, 15/11, 244/23
[51] Int. Cl. ................................................. B64c 21/06
[50] Field of Search .................................... 244/73, 130, 62, 12, 23, 15; 114/67; 115/11; 239/557

[56] References Cited
UNITED STATES PATENTS

| 1,408,178 | 2/1922 | Downing | 115/11 |
| 1,938,234 | 12/1933 | Voorhees | 244/23 |
| 2,071,744 | 2/1937 | Anthor-Hendrikson | 244/12 |
| 2,464,663 | 3/1949 | Zingg | 244/12 |
| 3,045,948 | 7/1962 | Howie | 244/12 |
| 3,097,817 | 7/1963 | Towzey, Jr. | 244/15 |
| 3,469,802 | 9/1969 | Roberts et al. | 244/73 |

Primary Examiner—Milton Buchler
Assistant Examiner—James E. Pittenger
Attorney—B. P. Fishburne, Jr.

ABSTRACT: A device or machine which, when operating in a fluid such as air or water, produces at and contiguous with the operating or working face thereof a substantially flat and homogeneous boundary layer of fluid in which the pressure is significantly lower or higher than the prevailing pressure or pressures in the surrounding fluid in which the device is operating. The device may be a part of any craft, ship, vehicle or other body and the useful force created at said boundary layer of fluid may be utilized to provide lift, control, translation in any direction, or to overcome prevailing forces effecting any craft, ship, vehicle or the like.

INVENTOR
DOUGLAS F. KOEPPE

B. P. Fishburn Jr.
ATTORNEY

DEVICE FOR PRODUCING USEFUL FORCES IN FLUIDS

CROSS-REFERENCE TO RELATED APPLICATION

This application is a continuation-in-part of my prior copending application Ser. No. 702,086, filed Jan. 31, 1968 now abandoned, for DEVICE FOR PRODUCING USEFUL FORCES IN FLUIDS.

BACKGROUND OF THE INVENTION

The invention is related to that class of work-producing device or means which utilizes the movement of a fluid in relation to a working surface of the device to produce an adjacent localized fluid zone in which pressure is either increased or decreased relative to the pressure of surrounding fluid in which the device is operating or working. This broad category of machines includes many types of aircraft and watercraft and the propulsion and sustaining means therefor. The prior art reveals many examples and many variations of instrumentalities in this general area.

The prior art in the broad field of the invention appears to have adhered to certain established practices without major deviation and the prior art devices are known to have definite deficiencies and inefficiencies which have not been successfully overcome or improved upon to a satisfactory extent. The most relevant prior art constructions fall into two main categories and, as such, are far short of the invention in efficiency of operation. The first category of prior art devices may be termed independent nozzles or closely arranged bundles of nozzles, where no effective surface areas as such remain among the individual nozzles. The second prior art category comprises devices which embody spaced independent nozzles within a surface element, but without a definite and intimate relationship enabling the nozzles to coact in a useful manner with the surface in which they are formed or with which they are associated.

The invention herein overcomes the principal deficiencies of the prior art related devices through the provision of a device which involves an intimate and precise relationship between nozzles or orifices and the surface areas which separate them. In the invention, the nozzles or orifices, including the walls thereof, and the intervening surface areas coact in a completely unique manner to form a highly efficient functioning entity which, to a great extent, eliminates some of the most important weaknesses of the prior art pertaining to devices for producing working forces in fluids. More specifically, the present invention provides for the formation of a well-defined almost completely uniform layer of either rarefied or compressed fluid coextensive with the working face of the device or machine. This has not been accomplished in the prior art. Additionally, the invention to a great extent eliminates the disastrous waste of energy at the periphery of the working device, which waste has consistently occurred in the prior art.

SUMMARY OF THE INVENTION

In its most basic aspect, the invention will comprise a body or means forming a chamber or a passage through which a fluid will pass as when being drawn into or expelled from the chamber or passage. At least a surface portion of the body forming the chamber or passage will constitute a working face, and this working face consists of a precise arrangement of nozzles, orifices or perforations and intervening surface areas which actually impede the movement of fluid in either direction at the working face. The velocity of the moving fluid through the numerous relatively small orifices or nozzles of the working face is increased, with a resulting reduction in pressure in the multiple fluid streams. The net effect of the fluid flow in either direction through the working face will be the development of a rather exactly defined fluid layer or zone adjacent the working face, within which layer or zone pressure is reduced or increased relative to the pressure of the surrounding main body of fluid in which the invention is operating. Whether the pressure in said layer or zone is increased or decreased depends upon the direction of flow of the fluid relative to the working face. The resulting fluid boundary layer at the working face is substantially homogeneous and peripheral energy losses experienced with prior art devices are neutralized and rendered substantially nonexistent over the area of the working face, except for very minor edge losses. Smoothly rounded and symmetrical orifice walls reduce friction losses and drag on the invention to a minimum. The orifices or nozzles are equally spaced from one another and the distance between centers is such that, for a given, or chosen, size hemisphere, which is the locus of all points having the same velocity or pressure about each orifice, the hemispheres overlap to such a degree that 1½ times the volume of any one zone where two hemispheres overlap, plus twice the volume of the zone where all three adjoining hemispheres overlap, exactly equals the volume between a plane tangent to those three adjoining hemispheres and the nonoverlapping surface of said three hemispheres.

DESCRIPTION OF THE PREFERRED EMBODIMENTS

Figure 1:
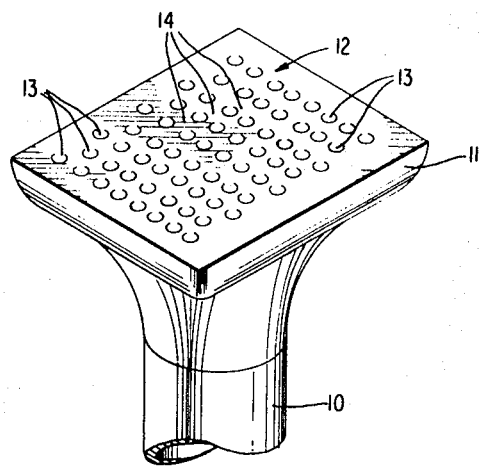
FIG. 1 is a fragmentary perspective view of an embodiment of the invention.
Figure 2:
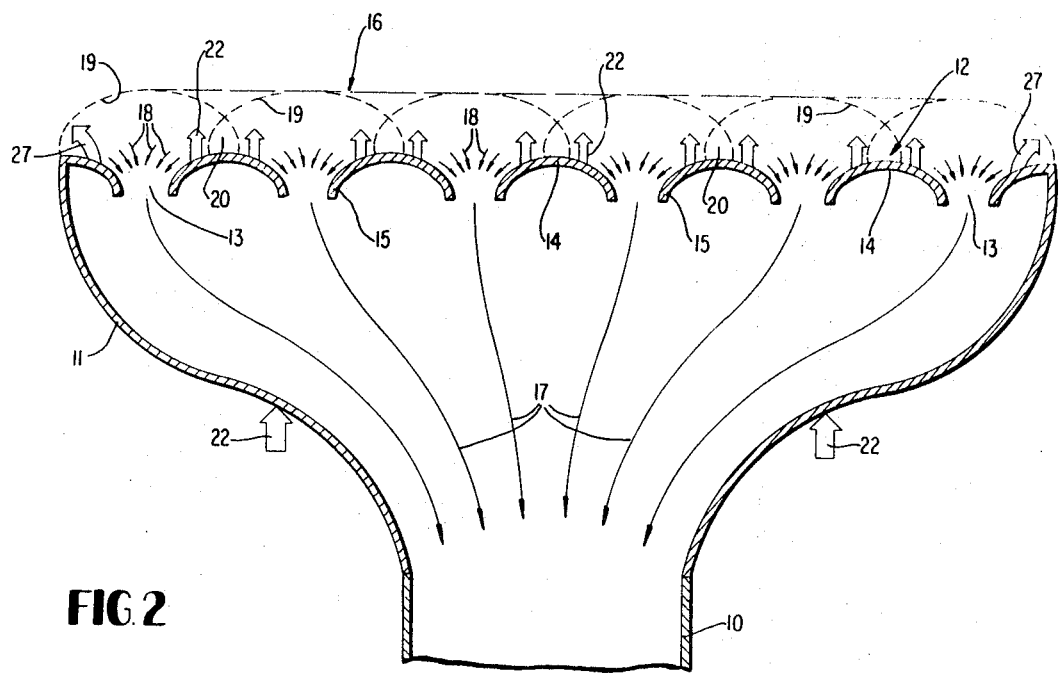
FIG. 2 is an enlarged fragmentary, partly diagrammatic vertical section, through the embodiment of FIG. 1.

Referring to the drawings in detail, wherein like numerals designate like parts, attention is directed first to FIGS. 1 and 2 showing an embodiment of the invention. In these FIGS., the numeral 10 designates a conduit or duct leading to and connected with a source of power, not shown. This power source may be an engine, machine or device capable of creating suction or positive pressure. Various forms of fans, pumps and jet engines may be utilized in conjunction with the invention. One terminal end of the conduit 10, in some instances, is joined to a significantly enlarged fluid intake or exhaust head 11 of any desired shape and whose cross-sectional area may be several times that of the conduit 10 to provide optimum efficiency.

The head 11 in the embodiment illustrated includes a planar working face 12 which may be perpendicular to the axis of the conduit 10 or at an angle thereto or parallel therewith. Additionally, the working face need not be a flat or plane face and its configuration will vary in accordance with numerous practical applications.

Formed through the working face 12 is a multiplicity of spaced orifices or perforations 13 in the nature of individual nozzle openings and having a fixed and precise intimate relationship with the intervening imperforate surface portions 14 which make up the remainder of the working face 12. The orifices or nozzles 13 are uniformly and equidistantly distributed over substantially the entire working face 12 so that the intervening surface portions 14 are also equally sized and distributed. As shown in FIG. 2, the individual orifices 13 are preferably shaped to create smoothly rounded orifice sidewalls 15 whose purpose is to minimize drag and fluid friction during fluid flow through the orifices. The precise relationship of the orifice 13 to intervening surface area 14 forms the essence of the invention and will be later described in full detail.

The precise shape, size and spacing of the orifices 13 will vary in practice and will depend on the total area of the working face 12, the velocity of the invention within the surrounding fluid mass, such as air or water, the nature of the fluid and certain other variables peculiar to a particular use of the invention. In all cases, however, the orifices will be sized and spaced so that the flow of fluid through them will result in the formation of a rather exactly defined flat homogeneous fluid layer 16, wherein the pressure is significantly higher or lower than the existing pressure in the larger body of fluid within which the invention is operating. The practical limits of the uniform homogeneous layer of fluid created at the working face 12 is graphically illustrated by the numeral 16 in FIG. 2 in an approximate manner. Whether the pressure of fluid within the layer 16 is reduced or increased relative to the general surrounding fluid will depend on the direction of fluid flow through the orifices 13. In this latter connection, the operation of the invention is reversible depending upon the particular application thereof. FIG. 2 illustrates a situation where suction is being applied downstream to the conduit 10 for drawing external fluid through the orifices 13 to create a partial vacuum in the interior of the head 11 and a layer 16 of reduced pressure relative to the surrounding larger body of fluid within which the device is situated. Reverse fluid flow through the device will cause the layer 16 to have increased pressure relative to the surrounding fluid.

Continuing to refer to FIG. 2, the power source connected with the conduit 10 is evacuating fluid from the interior of the enlarged head 11 at such a rate as to maintain therein a reduced or negative pressure relative to the pressure in the outside surrounding fluid. Arrows 17 in FIG. 2 indicate the general flow path of fluid within the head toward the conduit 10. The fluid within the head 11 is exposed to fluid pressure outside of the head through the several orifices 13. The arrows 18 indicate the general directions of flow in the external fluid into and through the orifices or nozzles 13. In accordance with well-known laws of physics pertaining to fluids, as the velocity of the outside fluid is increased due to being drawn toward and through the restricted passages afforded by orifices 13, the pressure of this fluid is correspondingly decreased. The speed at any given instant of any particle of outside fluid being drawn toward any particular orifice 13 is an inverse function of the distance of said particle from the orifice 13, and therefore the decrease in pressure in the external fluid at the particle due to the effect of the orifice is an inverse function of the distance of said particle from the orifice.

The theoretical although practically accurate zones 19 shown in FIG. 2 surrounding each orifice 13 graphically indicate the practical limits of reduced pressure in the external fluid caused by fluid flow into the orifices. The size and shape of the orifices 13 is such that the zones 19 overlap as at 20. The molecules of fluid in the regions 20 are effected not only by the reduction in pressure at one orifice but also by the corresponding reduction in pressure at each immediately adjacent orifice in all directions on the working face 12. The effect of this overlapping of reduced pressure zones at 20 is a net extension of the practical limits of reduced pressure zones 19 to form the total reduced pressure uniform boundary layer 16.

Figure 7:
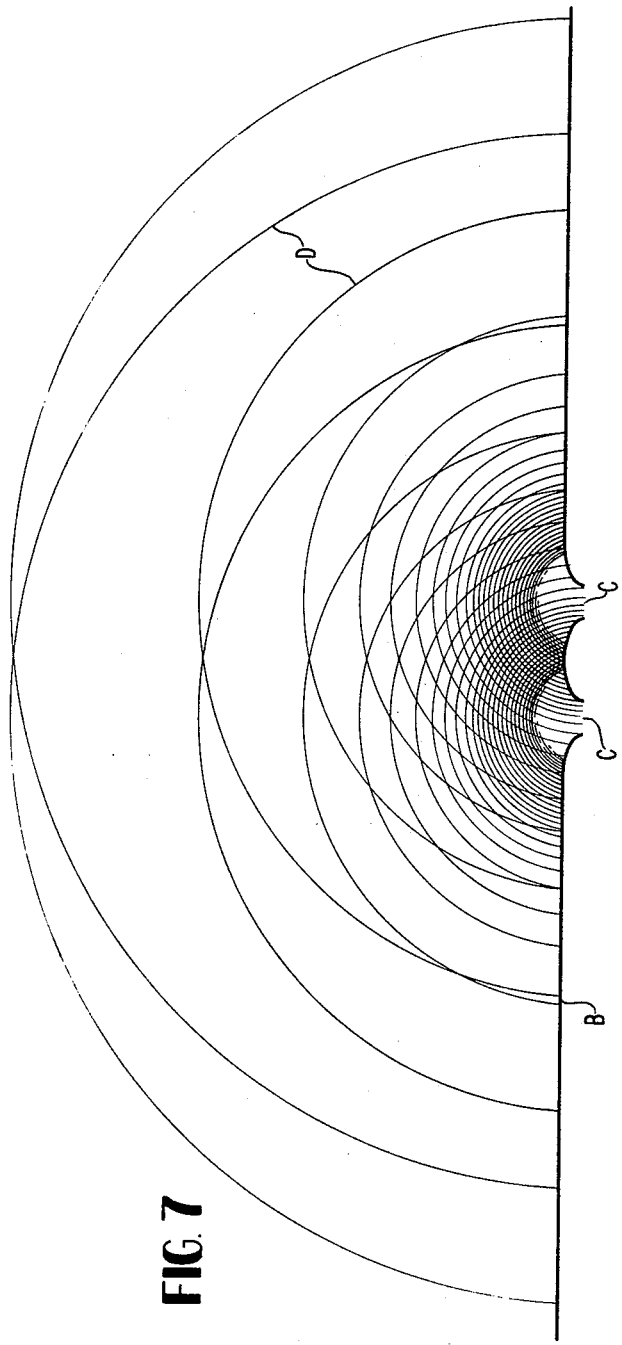
FIGS. 7—10 are theoretical diagrams illustrating the precise geometric relationship between surface and orifice.

Referring now to FIG. 7 of the drawings, there is shown in cross section diagrammatically a surface B corresponding to the working surface 12 having therein two nozzles or orifices C in rather close proximity, one to the other. The concentric semicircles shown at D indicate the loci of points where the fluid pressure is the same, or where the velocity of the fluid moving toward the orifices C is equal. In FIG. 7, these semicircles D are shown to overlap. The spacing of the concentric semicircles gives a general indication of the velocity gradient of the fluid moving toward the orifices C. In practice, however, when fluid is moving toward two orifices in close proximity as in FIG. 7, the semicircular lines of equal pressure or velocity will not remain as shown.

Figure 8:
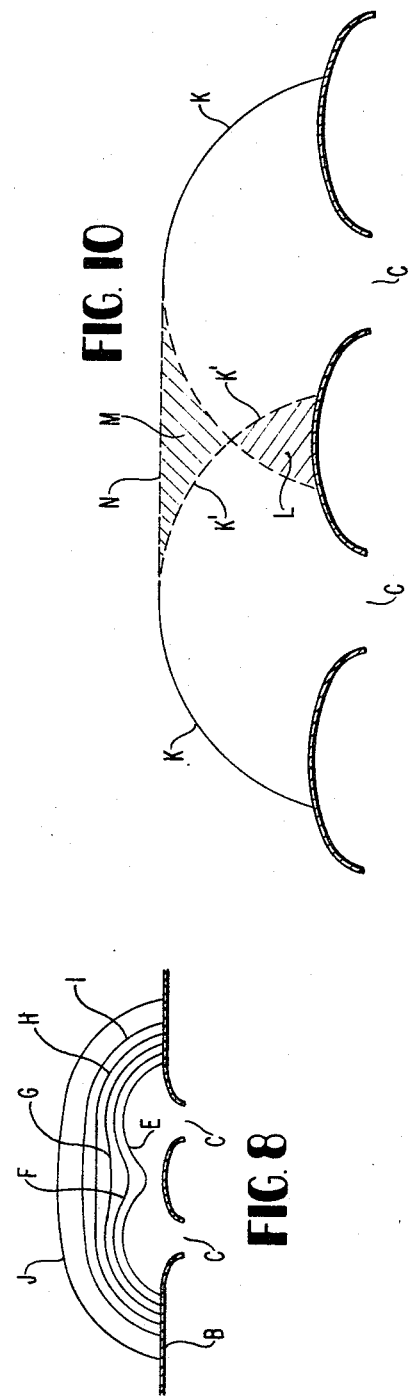

FIG. 8 indicates in section the rearrangement of said lines of equal pressure or velocity caused by the interaction of the two orifices C. It is desirable that a layer of fluid of low pressure at a surface, in order to be efficient, be as "flat" as possible. By making the layers as flat as possible, the amount of wasted force at the periphery is reduced to a minimum compared to the amount of useful force available over the remainder of the low-pressure area. Referring to FIG. 8, lines E, F, G, H, I and J represent the loci of points in the fluid where the pressure is the same, or where the velocity of the fluid moving toward the orifices C is the same. It must be pointed out here that at any point on any line of equal pressure or velocity, the direction of the fluid moving toward the orifice is along a line normal to the curve at that point, or, in other words, toward the center of curvature of the line at that particular point. It should be obvious, therefore, that the drawing in toward the orifices C of fluid in directions other than normal to the general plane of the surface B in which the orifices are located represents inefficiency and less than optimum utilization of energy. The most efficient portion of an area of low pressure adjacent to a surface, therefore, is that portion where the fluid is drawn toward the orifices in said surface in a direction normal to the surface.

In FIG. 8, curves G, H and I have the greater portions of their lengths parallel to the plane of surface B in comparison to the curves E, F and J. Actually, curve H is the most useful portion of the fluid layer surrounding the orifices C since it contains as part of its length a line truly parallel to the plane of surface B.

Figure 10:
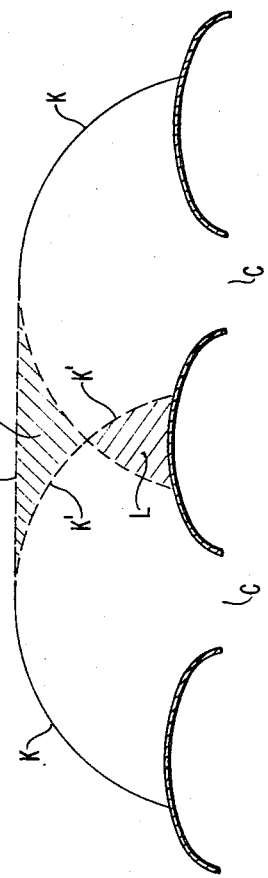

FIG. 10 illustrates how the distance between centers of adjacent orifices C is related to the formation of a layer of low-pressure fluid, such that a curved line connecting points of equal pressure or velocity has as a portion thereof a line parallel to the general plane of the surface containing the orifices. The solid-line portions K, together with broken-line curve portions K', represent the lines of equal pressure or velocity in the fluid about the orifices C, if they were not placed in such close proximity, but were rather in operation independently at some distance apart. However, in order to produce the result desired in the invention, the distance between the two orifices C is made such that these semicircles K, K' representing lines of equal pressure or velocity are made to intersect and overlap as in FIG. 10. The precise defining relationship between orifices and intervening solid surface in the invention is that the area L formed by the overlapping of the two semicircles in FIG. 10 is exactly equal to the area M, whereby the broken line N tangent to the two semicircles is also parallel to the general plane of the surface B containing the orifices C.

Referring to FIGS. 7 and 8, it is obvious that theoretically at least when fluid is drawn in through a pair of orifices in a surface, no matter what the distance is between said orifices, there can be found, in section, two semicircles about those orifices which overlap to such an extent that, as shown in FIG. 10, the area L of overlap is equal to the area M necessary to "fill out" the semicircles so as to form a line tangent thereto and parallel to the general plane of the surface B. The reason why this overlapping of semicircles causes the lines joining points of equal pressure or velocity in the fluid to be extended out to the desired amount is that the molecules of fluid in the area L of overlap are drawn off or evacuated at twice the rate that they would normally be evacuated if the semicircles K, K' did not intersect and overlap. Therefore, for any two intersecting circles, the amount of extension M of the semicircles will equal exactly the area L of overlap and this fact lies at the heart of the invention.

It follows therefore, by varying the distance between centers of two adjacent orifices in a surface, there can be produced zones of low-pressure fluid which overlap in such a way that the loci of all points at which the velocity or pressure of the fluid is given value forms an arc or curve which has a portion thereof a straight line parallel to the general plane of the surface in which the orifices are formed. Also, there exists for any two given adjacent orifices one, and only one, locus having this preferred form; that is, having as a portion thereof a straight line parallel to the surface containing the orifices. The loci points of equal pressure or velocity very nearly equal to those points whose locus forms the desired curve do not themselves differ greatly in form from the desired curve.

The question arises, which pressure or velocity shall be chosen and how the proper distance between orifices shall be set, so that the locus shall be of the desired form. The answer involves the fact that when the orifices are separated by greater distances between centers, although the large semicircles about those orifices might overlap in such a way as to form a desired curve, nevertheless, the pressures involved in such large semicircles are not as low nor are the fluid velocities as high as for points lying on smaller semicircles about said orifices. Therefore, a large curve of the desired form is not as useful as a small or tight curve of the desired form, the latter involving a sharper pressure or velocity gradient. Therefore, one criterion for the precise relationship between orifices and intervening surface area will be:

For a given rate of fluid evacuation, orifices should be as small as possible (without increasing the friction coefficient unduly), and the distance between orifices' centers should be such that the smallest possible semicircles, where the velocity of the fluid is greatest, where the pressure is least, overlap to form from said smallest semicircle the desired curve, i.e., having as a portion thereof a straight line parallel to the surface in which the orifices are contained.

The second criterion will be:

For a given rate of evacuation of fluid through nozzles or orifices in a surface, the size of the orifices and the distances between the centers thereof shall be such that the ratio of the length of the straight line portion of the desired locus formed compared to the length of the remainder of said locus is a maximum. That is to say, the length of the straight line N, FIG. 10, will be at a maximum.

Figure 9:
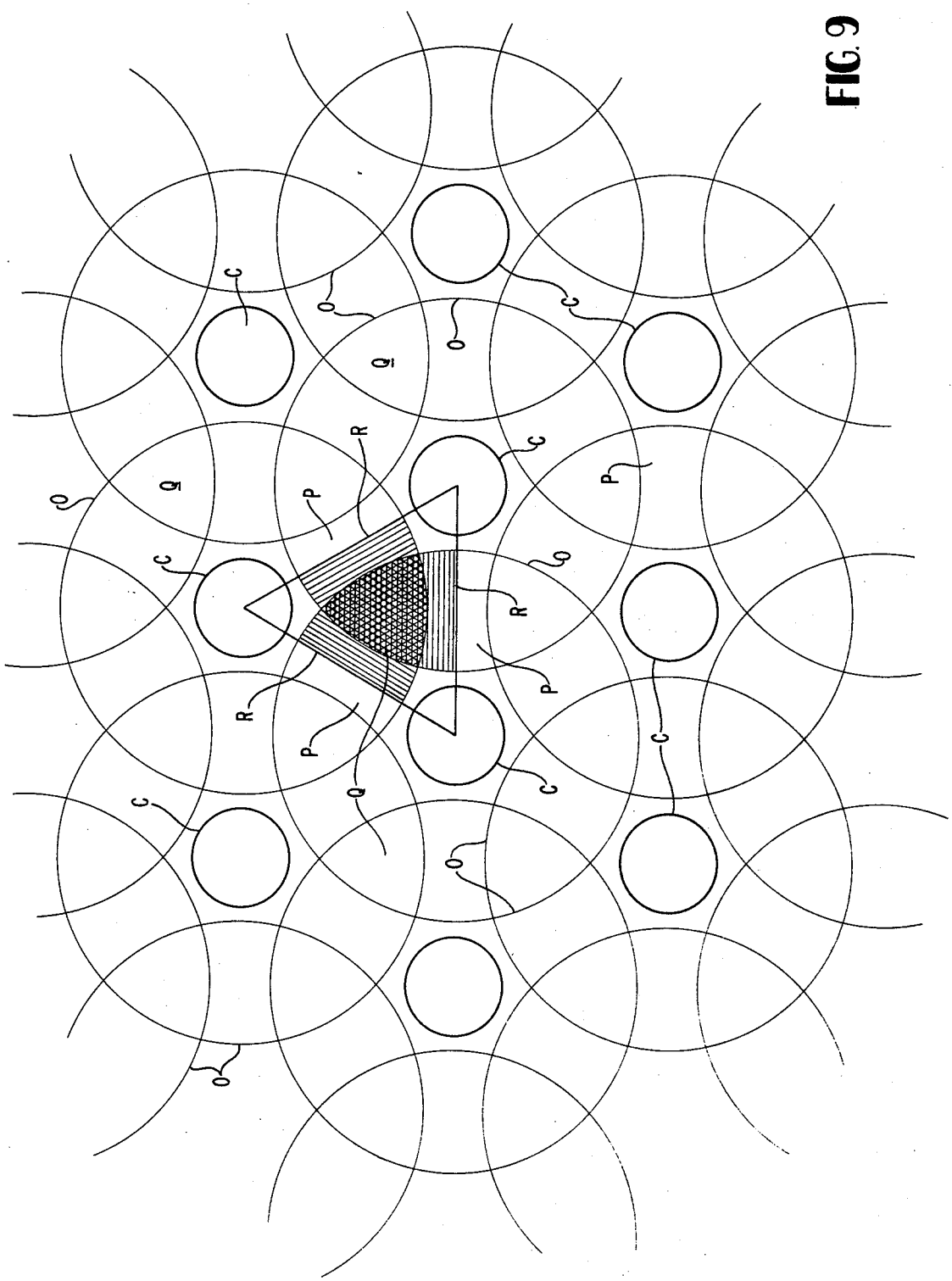

In the foregoing analysis referring to FIGS. 7, 8 and 10, only a pair of orifices C in a single vertical plane have been considered for the sake of simplicity. In actual practice with a three-dimensional embodiment of the invention, the orifices C are arranged as shown in FIG. 9 which is a plan view on an enlarged scale of a fragment of a working face embodying the invention, such as the working face 12. In FIG. 9, the several equidistantly spaced orifices are again indicated at C and the overlapping concentric circles O indicate in plan view the hemispheres which are the loci of points in the fluid where the pressure or velocity is equal around the adjacent orifice C. The zones where two adjacent hemispheres O overlap are indicated at P, and those zones where three of the hemispheres overlap are indicated at Q. For clarity in FIG. 9, the overlapping zones or portions thereof pertaining to three particular orifices have been shaded.

The three lines designated R in FIG. 9 are all tangent to two adjoining hemispheres O and are parallel to the general plane of the surface containing the orifices C. Since all of the hemispheres are considered equal, a plane is formed by the three lines R, said plane being tangent to the three hemispheres. Whereas in FIG. 10 the semicircles K, K' were made to overlap in such a way as to fill up the area M, in FIG. 9, a three-dimensional representation, the zone necessary to be filled out by overlapping hemispheres is that zone between the three overlapping hemispheres and the plane bounded by the lines R. Since from the zone where two hemispheres overlap, the fluid is evacuated at twice the rate of evacuation where the hemispheres not overlapping, therefore each of the three half-zones where two adjoining hemispheres overlap beneath the plane of lines 14 contributes toward the filling of the space between the plane and the hemispheres a volume equal to the volume of said half-zone where two adjoining hemispheres overlap.

As stated, Q indicates the zone where three adjoining hemispheres O overlap. Since the fluid is evacuated from that zone at three times the rate of evacuation of nonoverlapping hemispheres, therefore the zone Q contributes to filling up the space under the plane bounded by the lines 14 a volume equal to twice the volume of the triple overlapping zone Q. It therefore follows that three equal adjoining hemispheres can be made to intersect or overlap in such a way that their surfaces can be made to extend so as to form a plane tangent to the original three hemispheres. This is precisely the object of the invention and the precise relationship between the orifices and the intervening surface areas between them can be defined in the following terms:

The orifices are to be equally spaced one from the other, and the distance between centers is such that for a given size hemisphere, which is the locus of all points having the same velocity or pressure about each orifice, the hemispheres overlap to such a degree that 1½ times the volume of any one zone where two hemispheres overlap, plus twice the volume of the zone where all three adjoining hemispheres overlap, exactly equals the volume between a plane tangent to those three hemispheres and the nonoverlapping surfaces of said three hemispheres.

Stated for a surface embodying this invention and containing a large number of orifices:

The orifices are to be equally spaced one from the other, and the distance between centers is to be such that, for a given size hemisphere, adjoining hemispheres overlap to such a degree that 1½ times the total volume of all zones where two hemispheres overlap, plus twice the total volume of all zones where three adjoining hemispheres overlap, exactly or very nearly equals the volume between a plane tangent to all of the hemispheres and the nonoverlapping surface of all hemispheres.

With regard to what size hemispheres should be chosen, e.i. what particular pressure or fluid velocity should be chosen, and therefore what the orifice size should be and the distance between centers thereof, the same two criteria hold for the three-dimensional case as for the two-dimensional, simply substituting "hemisphere" for "semicircle," "curved surface" for "curve," "area" for "length," and "plane" for "a straight line."

The existence of the completely uniform and well-defined homogeneous layer 16 of reduced pressure over the working face 12 causes useful forces to result in the direction indicated by the heavy arrows 22. This is a result of the difference in pressure at the working face 12 compared with the pressure at the rear side of the head 11.

Figure 3:
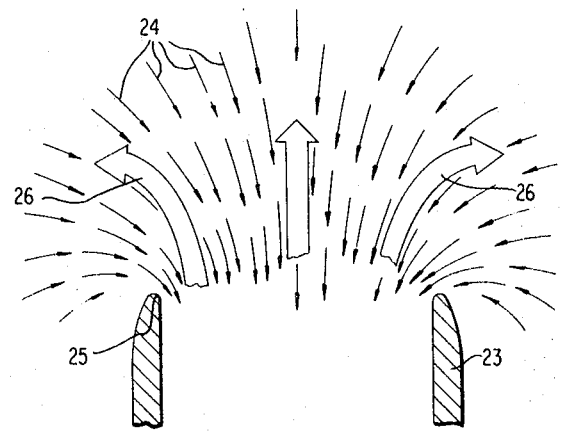
FIG. 3 is a cross-sectional view in diagram form of a prior art nozzle or intake conduit graphically illustrating the inefficiencies thereof.

The great advantage of the invention and the increased efficiency of operation embodied therein is more readily appreciated by a consideration of FIG. 3 which shows a typical prior art fluid intake conduit 23 or nozzle of the kind employed in existing jet engines, lift fans and the like. In FIG. 3, the arrows 24 indicate the flow of air or other fluid toward the mouth 25 of the nozzle 23, where the internal pressure is lowered by some power source, not shown, such as a fan or engine. The overall flow of outside fluid toward the nozzle is shown by the arrows 24 and it may be seen that the low-pressure area around the mouth of the nozzle extends over such a great extent in space with respect to the nozzle surface that much potentially useful energy or force is lost. Instead of the resulting force on the machine or device being applied in one direction, it is applied in mutually negating directions as indicated by the heavy arrows 26 which are illustrative of energy losses. By comparison, in FIG. 2, the degree of lost force through mutual negation is indicated by the marginal arrows 27 and this loss occurs only in a small peripheral region of the working device and is extremely small in comparison to the net useful forces indicated by the arrows 22. As explained, one of the prime features of the invention derived from the unique relationship of impeding surface 14 to orifice 13 is the elimination of the wasteful loss of resultant force or thrust as emphasized in FIG. 3. The combined action of the intervening surface portions 14 impeding airflow and the reduction in pressure caused by flow through the orifices 13 results in the unique consistent boundary layer 16 of reduced pressure and the elimination of energy by waste at the periphery of each orifice, as explained.

As already indicated, the operation of the invention may be reversed or a similar machine embodying the invention may be constructed to operate on the same principle, but in reverse. Such reverse operation will produce a localized layer of relatively high-pressure fluid at the same zone covered by the present reduced pressure layer 16 in the drawings. This simply involves reversing the flow of fluid indicated by the arrows 17 and 18, by causing fluid to be forced through the conduit 10 in the opposite direction at such a rate as to maintain a pressure in the head 11 significantly higher than the pressure of the external fluid surrounding the device.

Figure 4:
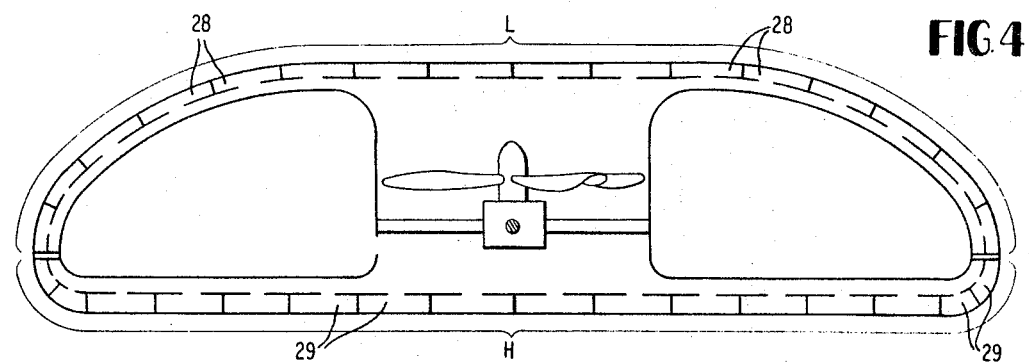
FIG. 4 is a diagrammatic view of a vehicular device embodying the invention.

The invention may be embodied in a vehicular machine, such as disclosed diagrammatically in FIG. 4 of the drawings. As shown in this FIG., an aircraft having a saucerlike configuration has a plurality of adjacent low-pressure areas or layers designated L at its upper surfaces and additional high-pressure areas or layers designated H at its lower surfaces. These layers or layer segments are produced in the same manner that the layer 16 in FIG. 2 is created or produced and maintained during the operation of the invention. The details of construction have been omitted in FIG. 4 and only a diagrammatic illustration is intended. By varying the intensity of segments or regions 28 and 29 of the low- and high-pressure zones in FIG. 4, the required lift necessary to overcome gravity may be achieved as well as the necessary resultant forces to produce directional movement of the craft. Various additional uses or applications of the invention should be readily apparent to those skilled in the art in light of the foregoing description.

Other important applications of the invention reside in incorporating the invention structure essentially as shown in FIG. 2 into the wings of jet aircraft which normally rely on the principle of a moving airfoil to produce lift. By modifying the wings somewhat to incorporate the invention therein over substantial areas of the upper and/or lower wing surfaces, and utilizing the duct work of the aircraft engine as a power source, the total lift through the wings can be greatly increased. This increased lift would be particularly valuable during takeoff and landing, thereby decreasing the necessary runway length. The invention would also permit passage of the aircraft through the atmosphere at slower speeds than must be maintained when the airfoil principle alone is being relied upon to produce lift.

Another important application of the invention resides in its use in the intake and exhaust nozzles or ducts of lift fan engines now being used in hovercraft and vertical takeoff and landing craft and the like. By placing the invention structure in the intake and/or exhaust ducts of these power plants, a much more efficient production of useful force is attained as has been fully explained in the preceding description.

The invention concept and structure as explained herein may also serve to control aircraft and seacraft of various types. The invention structure in such cases will be built into the control surfaces of the craft in such a manner that the orientation of the invention with respect to the craft of which they form a part may be altered. Such craft may be caused to turn, bank and stabilize and may be subjected to other control influences by means of the basic invention.

Figure 5:
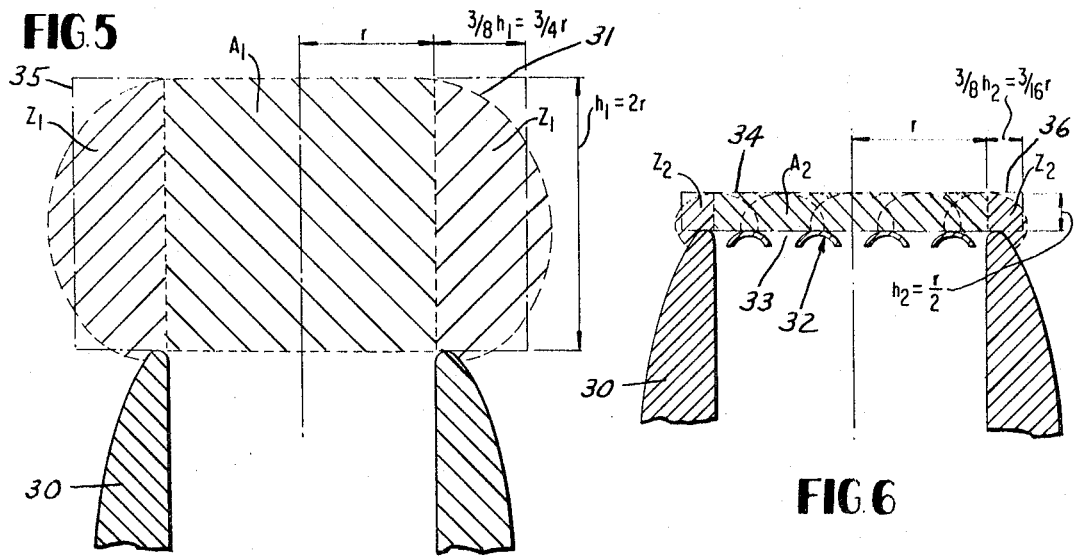
FIG. 5 is a fragmentary cross-sectional view showing a jet engine intake nozzle or the like in accordance with the prior art.
Figure 6:
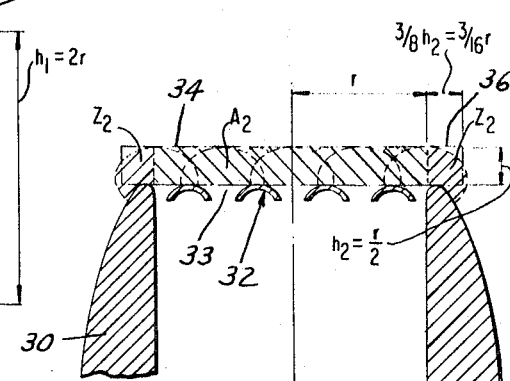
FIG. 6 is a cross-sectional view of the identical nozzle shown in FIG. 5 but with the invention applied thereto.

Another very simple embodiment of the invention is depicted in FIG. 6 of the drawings and this FIG. is to be considered in comparison to FIG. 5. Referring to FIG. 5, an ordinary jet intake nozzle 30 is depicted in cross section and this may be the intake of a jet aircraft engine or the intake nozzle of a lift fan as employed with VTOL aircraft. The broken line 31 joins points of equal pressure in the fluid about the mouth of the nozzle 30 affected by reduced pressure inside of the nozzle. The area designated $A_1$ indicates that portion of low-pressure fluid which is drawn directly into the nozzle mouth, normal to the nozzle orifice. The area $Z_1$ indicates the peripheral zone of fluid drawn toward the nozzle orifice in a direction not normal thereto, and therefore representing some waste in the form of useless forces due to unequal pressures at the periphery.

FIG. 6 is a cross-sectional view of the same intake nozzle 30 equipped at or near its mouth with a unit of the invention designated 32. This invention unit 32 consists essentially of the structure embodied in the working face 12 previously described in full detail and therefore includes plural orifices 33 and intervening flow-impeding surface areas similar to the areas 14 shown in FIG. 1. The unit 32 is fixedly secured to the nozzle 30 in any conventional manner. In FIG. 6, the line 34 indicates the locus of points having the same pressure as indicated by the line 31 in FIG. 5. Since the power source, not shown, is evacuating fluid from the interior of the nozzle 30 at the same rate in both FIGS. 5 and 6, and since there is less total orifice area available for fluid flow in FIG. 6, the velocity of the fluid is increased through the numerous smaller orifices 33. The velocity coefficient for smooth, rounded orifice walls, as shown in the drawings, may approximate 0.98 or 0.99 and therefore losses are quite small due to friction and drag.

A comparison of the pressure zones around the mouths of the nozzles in FIGS. 5 and 6 shows that the installation of the invention unit has the effect not only of flattering the affected zone of fluid around the nozzle but also of concentrating such zone.

In the illustrated example, FIG. 5, the height $h_1$ is twice the radius of the nozzle orifice $r$. In FIG. 6, the height $h_2$ is one-half the radius $r$, making the height $h_2$ of the affected zone in FIG. 6 one-fourth that of the comparable zone in FIG. 5. The illustrations of the pressure zones in FIGS. 5 and 6 are consistent with the science of fluid mechanics, and the volumes of the peripheral zones of less than optimum fluid flow $Z_1$ and $Z_2$ are calculated by considering rectangular areas of equal size as $Z_1$ and $Z_2$, respectively, as shown by the broken lines 35 and 36 in FIGS. 5 and 6. It may be observed that the volume of $A_1$ in FIG. 5 is one-half the volume of $Z_1$. However, in FIG. 6, the volume $A_2$ is 2½ times the volume of $Z_2$. This graphically portrays the marked effect of the invention unit 32 on the nozzle 30.

I claim:

1. In a device for producing a useful resultant force in one direction on a body within a fluid medium, a working face for said device comprising a platelike member having a multiplicity of contoured openings formed therethrough constituting a multiplicity of axially short substantially identical nozzles, said nozzles spaced apart equidistantly in all directions on the working face, the working face including a multiplicity of fluid-impeding solid portions intervened among the nozzles and being formed by the joining of the contoured bores of the nozzles where they blend into the working face, the contoured bore of each nozzle extending to and joining with the bores of all immediately adjacent nozzles in all directions on the working face, the spacing and the size of the nozzles being such that overlapping domes of pressure are developed around the individual nozzles in response to flow of ambient fluid through the nozzles in one direction simultaneously, and the degree of overlap of adjacent pressure domes being such that the surfaces of the domes are rearranged to produce a substantially flat homogeneous boundary layer of fluid at one side of the working face, the pressure in said boundary layer being different from the pressure of the ambient fluid in which the device is operating.

2. The structure of claim 1, and a chamber means connected with said working face and extending beyond one side thereof to conduct fluid from or toward the larger body of ambient fluid surrounding the device.

3. In a device, machine or vehicle for operation in a fluid medium, a working face portion comprising a fluid-impeding solid member having a multiplicity of contoured nozzle openings of uniform size formed therethrough and distributed thereover in equidistantly spaced relation on centers in all directions on the working face, the bores of the contoured nozzle openings being rounded and diverging at one side of the working face so that each nozzle opening extends to and joins all immediately adjacent nozzle openings on the working face substantially tangentially, the simultaneous flow of fluid through the nozzle openings of the working face producing generally hemispherical pressure zones around the individual nozzle openings on one side of the working face, said zones overlapping to such a degree that the intervening unpressurized regions between rounded tops of the zones are effectively filled out and pressurized to form a substantially flat homogeneous boundary layer of fluid, said filling out of said regions resulting from and equal to 1½ times the total volume of all double overlapping pressure zones plus twice the volume of all triple overlapping pressure zones, the resulting pressure in said flat boundary layer being significantly different from ambient fluid pressure.

4. The structure of claim 3, wherein said device is a vehicle having opposing surfaces thereon and said working face extends over at least portions of the opposing surfaces, whereby the vehicle can be propelled and stabilized in varying directions.

5. A device for producing a resultant useful force on a body in a fluid medium comprising a main conduit and chamber forming member adapted for connection with power means causing fluid to flow through the chamber and conduit, a generally flat platelike working face element spanning the mouth of said chamber and having a multiplicity of relatively small equally sized nozzles formed integrally thereon, said nozzles equidistantly spaced on centers in all directions and the nozzles tapering toward the conduit and diverging toward the exterior side of the working face, the working face having solid fluid flow impeding portions intervened among the nozzles, said impeding surfaces being frontally rounded and blending into the bores of the nozzles smoothly, whereby fluid flow through the nozzles toward the chamber and conduit and the simultaneous impedance to flow caused by said solid portions produces at the frontal side of the working face element a well-defined fluid layer whose pressure differs from the pressure of the surrounding fluid medium in which the device is situated, said layer being substantially homogeneous and extending substantially over the working face element.

6. In a device, machine or vehicle for operation in a fluid medium, a working face adjacent to which a resultant useful force is adapted to be produced, said working face comprising a barrier to the flow of ambient fluid and provided over a substantial portion of its area with a plurality of equidistantly spaced fluid-conducting nozzles of identical size and contour, the walls of said nozzles rounded and converging generally tangentially into the barrier portions of the working face, said nozzles tapering toward their outlets, said nozzles sized in relation to their spacing so that zones of pressure surrounding individual nozzles during flow of fluid through all of the nozzles will overlap, said overlapping resulting in the creation of a generally flat and homogeneous layer of fluid contiguous with the working face, said layer of fluid having a different pressure from that of the ambient fluid.